United States Patent [19]
Mishina et al.

[11] Patent Number: 5,467,912
[45] Date of Patent: Nov. 21, 1995

[54] REFLOW SOLDERING APPARATUS FOR SOLDERING ELECTRONIC PARTS TO CIRCUIT SUBSTRATE

[75] Inventors: Haruo Mishina, Ushiku; Masafumi Wada, Nagareyama; Mituo Fukuda, Matsudo; Masato Itagaki, Kashiwa; Shinya Yamama, Abiko, all of Japan

[73] Assignee: Hitachi Techno Engineering Co., Ltd., Tokyo, Japan

[21] Appl. No.: 155,798

[22] Filed: Nov. 23, 1993

[30] Foreign Application Priority Data

Nov. 27, 1992 [JP] Japan ................... 4-318601
Dec. 15, 1992 [JP] Japan ................... 4-334535

[51] Int. Cl.6 ................... B23K 35/38; B23K 1/012
[52] U.S. Cl. ................... 228/10; 228/8; 228/42; 219/388
[58] Field of Search ................... 228/10, 42, 43, 228/8; 219/388, 397, 1

[56] References Cited

U.S. PATENT DOCUMENTS 5,039,841  8/1991  Kato et al. ................... 219/388
5,163,599  11/1992  Mishina et al. ................... 228/42
5,296,680  3/1994  Yamada ................... 219/388

FOREIGN PATENT DOCUMENTS 64-71571  3/1989  Japan .
3-77773A  4/1991  Japan ................... 228/42

Primary Examiner—P. Austin Bradley
Assistant Examiner—Jeffrey T. Knapp
Attorney, Agent, or Firm—Antonelli, Terry, Stout & Kraus

[57] ABSTRACT

There is provided a reflow soldering apparatus for soldering electronic parts to a circuit substrate by blowing various inert hot gases of a desired density and temperature. A device for detecting whether or not a processing object is being conveyed into the apparatus is provided, so that the amount of inert gas to be supplied and the gas blowing speed are decreased when no processing object is present inside the apparatus. As a result, the amount of gas which flows out is made small, and a decrease in the temperature of the apparatus can be prevented. When the processing object is conveyed into the apparatus, the amount of supplied gas is increased so as to obtain a sufficient gas density. Thus, it is possible to prevent solder from being oxidized, and satisfactory solderability can be obtained.

8 Claims, 7 Drawing Sheets

REFLOW SOLDERING APPARATUS FOR SOLDERING ELECTRONIC PARTS TO CIRCUIT SUBSTRATE

BACKGROUND OF THE INVENTION

1. Field of the Invention

The present invention relates to a fellow soldering apparatus for soldering electronic parts to a circuit substrate by blowing various hot gases of a desired density and temperature. More particularly, the present invention relates to a fellow soldering apparatus capable of economically soldering by reducing the amount of consumed gas supplied to the apparatus, in order to maintain the gas density in the apparatus. Further, the present invention relates to a fellow soldering apparatus which blows a hot gas when a processing object is transferred on a conveyer, and which responds quickly to changes in the density of the gas which change occurs from changes in the gas flow direction, making it possible to reduce variations in the gas density and to obtain satisfactory solderability.

2. Description of the Related Art

In recent years, the circuit density of mounting boards has become increased, and there has been progress in the surface mounting thereof. When electronic parts are soldered to a circuit substrate, the fellow method has come to be widely used from the point of view of soldering reliability and productivity. In solder paste used for soldering, solder particles are formed to have a very fine size and no solid matter in the flux. When solder paste is formed to have this state, and if a circuit substrate is soldered by a conventional reflow method employing air, solder balls and wet defects occur frequently due to oxidation of solder particles and shortage of an activator.

Therefore, a reflow method employing an inert gas such as nitrogen in place of air has come to be used. A typical, known reflow apparatus which uses the above method, is disclosed in, for example, Japanese Patent Laid-Open No. 64-71571.

FIG. 1 is a schematic view illustrating the construction of a conventional reflow soldering apparatus. As shown in FIG. 1, a conventional reflow soldering apparatus comprises three preheating area (preheating chambers) blocks, two main heating area (reflow chambers) blocks, and one cooling area (cooling chamber) block.

Although the preheating chamber and the reflow chamber are connected to each other by an unillustrated portion for transferring a processing object, the chambers are divided by a partition (not shown). In the preheating chamber and the reflow chamber, a gas blowing type infrared heater 140 is used as a heater, disposed in pairs above and below an unillustrated processing object transfer passage (conveyer). A nozzle capable of freely adjusting the direction of gas to be blown is disposed in pairs in upper and lower positions between the infrared heaters 140. The gas, acting as a heat medium, is supplied and blown from a line 146 to the infrared heaters 140, and gas from a line 147 is sent out to nozzles 141 between the infrared heaters 140, and jetted out to an interior of a furnace. The gas blown out from the infrared heaters 140 is collected through a line 148 and then supplied to a cooling nozzle 142 through a blower 144 and a heat exchanger 145.

The processing object is transferred by the conveyer from left to right as indicated by the arrow X in the figure. It is preheated to a desired temperature by three pairs of infrared heaters 140 in the preheating chamber, then heated to the temperature at which solder is melted by two pairs of infrared heaters 140 in the reflow chamber, and cooled by the cooling nozzles 142 and cooling fans 143 in the cooling chamber, thus completing the soldering.

However, the above-described prior art has the following problems. There is a conveyer which passes through the preheating chamber, the reflow chamber and the cooling chamber in order to freely convey a processing object in or out of the apparatus, and the space above and below the conveyer is communicated with the atmospheric air. Therefore, since the gas, which is a heat medium, passes through this communicated portion and flows outside the apparatus, the operational cost of the apparatus increases because expensive gas is consumed, making it less economical. If the amount of supplied gas is decreased, the density of gas varies, oxidation of the solder progresses and satisfactory solderability cannot be obtained.

When the processing object is transferred through the preheating or reflow chamber, gas blown from the infrared heaters 140 and the nozzles 141 strikes the processing object and changes from a vertical movement to a horizontal movement. When this change of direction occurs in the boundary between the preheating chamber and the reflow chamber, or near the boundary between the reflow chamber and the cooling chamber, gas is made to flow out or flow in between the chambers, and the gas density in each chamber varies. For example, when the processing object is positioned near the entrance to the reflow chamber, gas is caused to flow out from the reflow chamber to the preheating chamber. Therefore, the gas pressure in the reflow chamber decreases slightly, and a cool gas having a high oxygen density flows in from the cooling chamber according to the extent of such a decrease. When the density of a nitrogen gas decreases in the reflow chamber, solder is oxidized, or the temperature of the gas decreases, making it impossible to obtain satisfactory soldering.

As a countermeasure for the above, a gas sensor may be disposed in each chamber in order to detect variations in the gas density, and feedback control may be performed so that the shortage may be compensated for in response to the variations. However, at present, no gas sensor which quickly detects slight variations in gas density so as to perform feedback control is available. The gas density may vary greatly by the time the shortage is compensated for, and oxidation of the solder progresses. Therefore, satisfactory soldering cannot be obtained.

SUMMARY OF THE INVENTION

Accordingly, it is an object of the present invention to provide a reflow soldering apparatus in which variations in the density of an inert gas are small, thereby suppressing oxidation of solder, making it possible to obtain satisfactory solderability.

It is another object of the present invention to provide a reflow soldering apparatus in which the amount of expensive gas consumed is reduced and the operating cost is low, thus making the apparatus highly economical.

It is a further object of the present invention to provide a reflow soldering apparatus which responds quickly to variations in the gas density in a preheating chamber or reflow chamber in accordance with transferring of a processing object inside the apparatus, and which reflow soldering apparatus is capable of reducing variations in the gas density, and is capable of obtaining satisfactory solderability.

To achieve the above-described objects, according to the present invention, there is provided a reflow soldering apparatus, comprising:

a conveyer which transfers a processing object composed of a circuit substrate which is applied with solder and is mounted with electronic members to a preheating chamber, a reflow chamber and a cooling chamber, a means for soldering said electronic members to said circuit substrate by melting said solder with impinging a hot inert gas upon said processing object for preheating and main heating during transferring through said preheating chamber and said reflow chamber and by cooling said solder with exposing said processing object to a cool inert gas during transferring through said cooling chamber, means for outputting a signal indicating that a processing object is conveyed into said preheating chamber, and means for controlling said hot inert gas blown onto said processing object and inert gas supplied to at least said reflow chamber, wherein the control means reduces both the amount of said hot inert gas blown and the amount of said inert gas supplied to at least said reflow chamber in accordance with a signal output from said signal output means in such a state where no processing object is being conveyed into said preheating chamber.

The reflow soldering apparatus will now be explained below in more detail.

Even when, after the reflow apparatus is started, reflow conditions, such as a conveyer speed, the revolutions (gas blowing speed or blown amount) of a gas circulating blower, the amount of gas supplied, or gas temperature (all of which are determined beforehand in accordance with the processing object) reach set values, the processing objects are not always continuously conveyed into the reflow chamber. Therefore, when no processing object is present inside the reflow apparatus, the amount of hot gas blown is set at an allowable minimum value and the amount of gas supplied is reduced, causing the reflow apparatus to enter a standby state. When it is determined that the processing object has been conveyed into the apparatus on the basis of a signal from a processing object detecting device disposed in an entrance to the apparatus, or an entrance to or an exit from the apparatus, or a signal indicating that the processing object has been conveyed into the apparatus (for example, a parts mounting machine) in a previous stage, the revolutions or the like of the gas circulating blower is increased so as to return the amount of gas blown, the blowing speed and the amount of supplied gas to their set values. When the circuit substrate passes through the reflow apparatus so that it exists no longer inside the apparatus, the reflow apparatus is changed to the above-mentioned standby state.

From the research carried out by the inventors of the present invention it has been discovered that the gas density inside the reflow chamber decreases if merely the amount of gas supplied is reduced while stopping the gas-blowing operation, so that air flows into the reflow chamber from outside the apparatus in consequence of this decrease, and therefore, on the contrary a great amount of gas must be supplied in order to make the density return to the original gas density. However, in a case where the amount of gas blown or blowing speed is decreased without stopping of the gas blowing, the desired gas density can be maintained even if the amount of the supplied gas is decreased, so that when the processing object is conveyed into the apparatus, it is possible to make the gas density quickly return to a desired gas density. That is, when the reflow apparatus is in a standby state, if, for example, the revolutions of the hot gas circulating blower is see at an allowable minimum for the apparatus, the desired gas density can be maintained by using a reduced amount of supplied gas, making it possible to reduce the amount of gas consumed.

If the revolutions of the hot gas circulating blower are suddenly returned from the minimum value to a set value, the amount of the hot gas circulated increases, and the temperature of the hot gas decreases temporarily due to the delayed heating by the heater. Therefore, when the speed of the conveyer is high, there occurs a case in which the density and the temperature of the hot gas do not return to their set values even if the processing object is conveyed into the apparatus. In connection with this, if the temperature of the hot gas is made high beforehand in accordance with a difference between the set value and the minimum value of the revolutions of the blower, the hot gas returns to its set value quickly. Thus, it is possible to improve the reliability of the apparatus and widen the fields of applications thereof.

To achieve the above-described objects, a reflow soldering apparatus in accordance with the present invention comprises means for detecting the flow speed of gas flowing between chambers in the boundary of the chambers; and gas flow-rate control means which computes variations in the gas flow between the chambers on the basis of an output from the detecting means and controls a gas flow-rate control valve so as to perform gas blowing from nozzles disposed in each chamber so as to prevent variations in the gas flow between the chambers.

Further, to achieve the above-described objects, a reflow soldering apparatus in accordance with the present invention may comprise detecting means for detecting that the processing object is conveyed into an entrance to the preheating chamber, instead of the gas flow-speed detecting means; gas flow-rate control means which computes variations in the gas flow between the chambers on the basis of an output from the detecting means and controls a gas flow-rate control valve so as to perform gas blowing from nozzles disposed in each chamber so as to prevent variations in the gas flow between the chambers.

In the preheating chamber and the reflow chamber, gas is supplied at all times in order to maintain these chambers at a desired gas density. When no processing object is being conveyed, the internal pressure of each chamber is determined in accordance with the gas supplied to each chamber, and a gas flow between the chambers based on the difference in the initial pressures is created. When the processing object which has been conveyed is positioned in the boundary between the chambers, the processing object acts as a guide to change the flow of the supplied gas, and a state is realized in which the gas flow between the chambers not based on the difference in the initial pressures is created.

When the flow speed of the gas flow is greatly varied, this can be quickly detected by a gas flow-speed detecting sensor. Also, transferring of a processing object can be easily detected by a transfer detecting sensor. Variations in the flow rate of gas between the chambers can be computed from a communicated area between the chambers. Thus, gas is blown onto a communicated portion between the chambers in accordance with variations in the computed flow rate of gas between the chambers, thus preventing gas from flowing in. Since these operations can be performed quickly, it is possible to make the variations in the gas density small.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DESCRIPTION OF THE PREFERRED EMBODIMENTS

Figure 1:
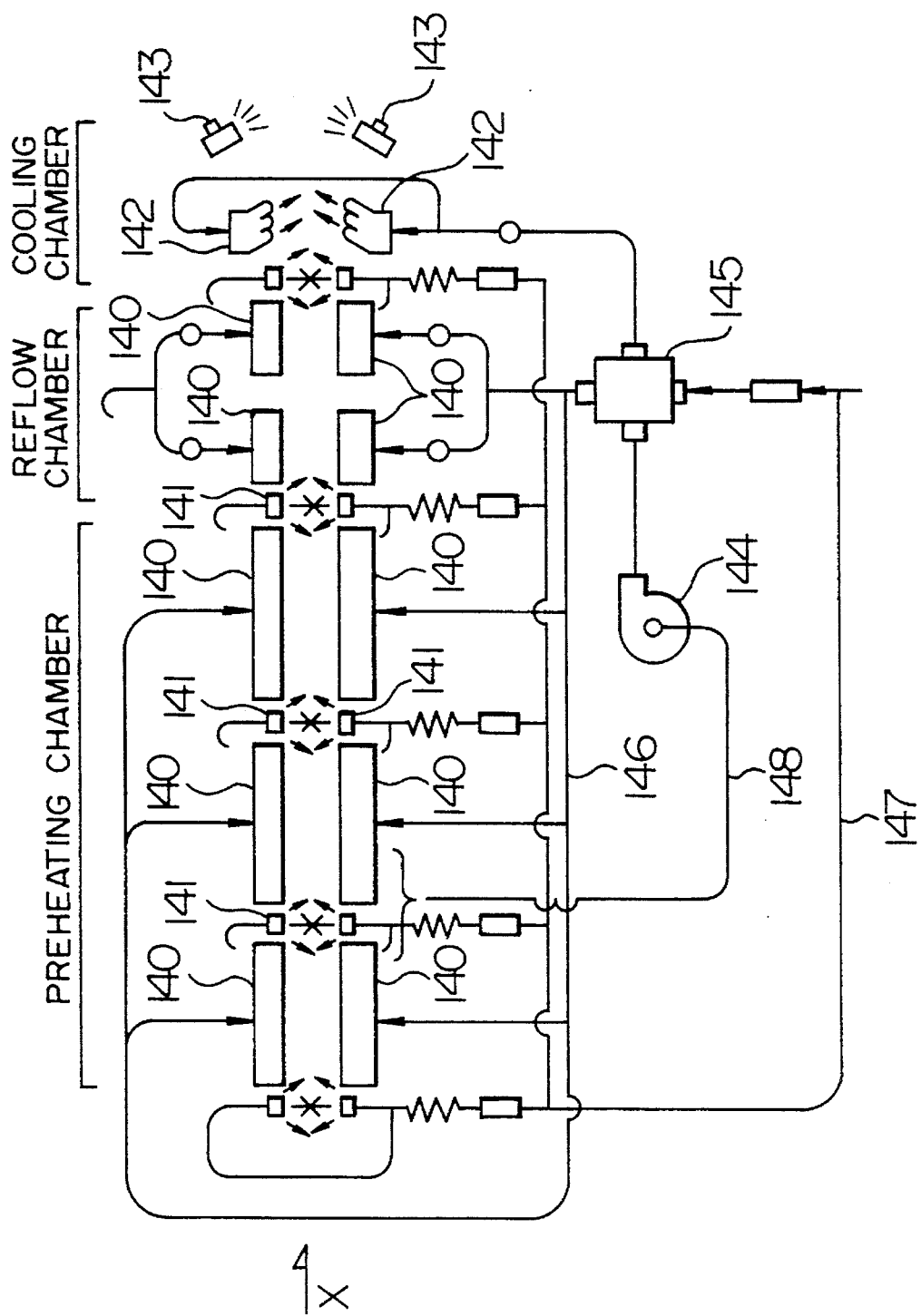
FIG. 1 is a schematic view illustrating the construction of a conventional reflow soldering apparatus.
Figure 2:
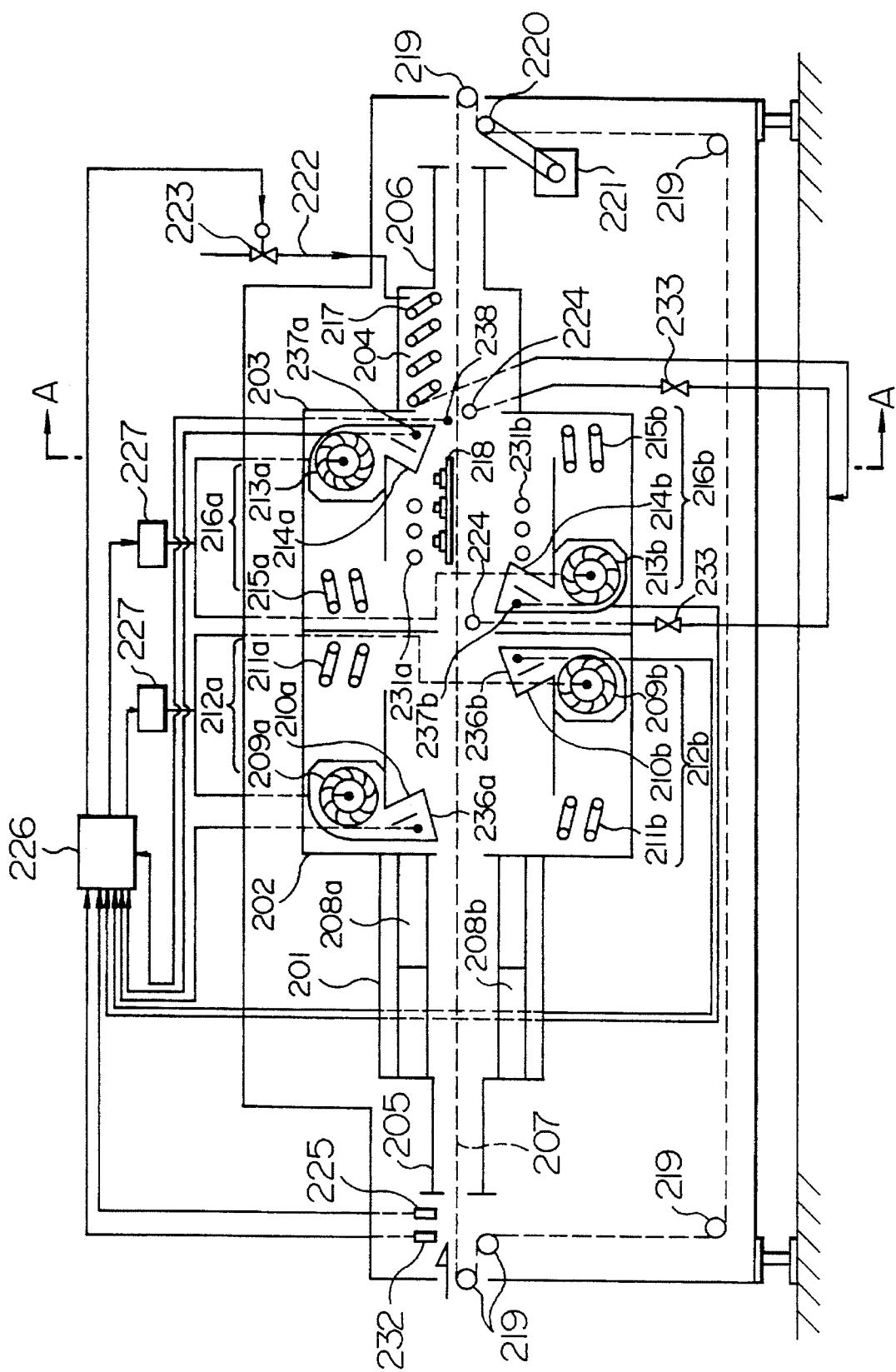
FIG. 2 is a schematic longitudinal sectional view illustrating the construction of a reflow soldering apparatus in accordance with an embodiment of the present invention.
Figure 3:
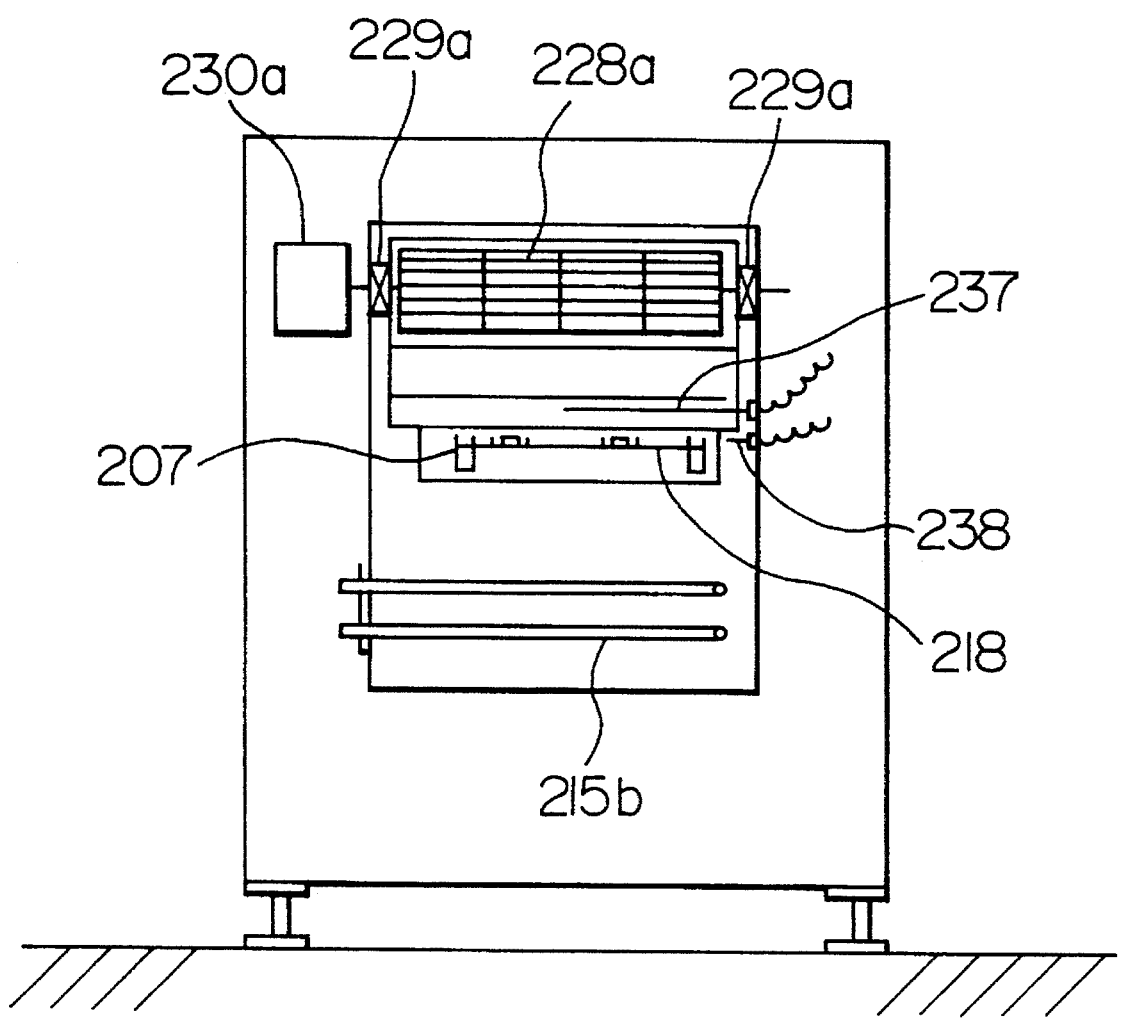
FIG. 3 is a lateral sectional view taken in the direction of the arrows A—A of FIG. 2.

In FIGS. 2 and 3, subscripts a and b of the reference numerals indicate the parts that are present above and below a conveyer 207, respectively. For example, reference numeral 208a in a first zone 201 of a preheating chamber denotes an infrared heater disposed above the conveyer 207, and reference numeral 208b denotes an infrared heater disposed below the conveyer 207. When these are collectively referred to, the subscripts a and b are not used, for example, it is referred to as an infrared heater 208.

The reflow soldering apparatus shown in FIGS. 2 and 3 comprises a first zone 201 of the preheating chamber, a second zone 202 of the preheating chamber, a reflow chamber 203, a cooling chamber 204, a conveying-in side seal chamber 205, and a conveying-out side seal chamber 206. An endless conveyer 207 is disposed for conveying a processing object 218 through the conveying-in side seal chamber 205, the first zone 201 of the preheating chamber, the second zone 202 of the preheating chamber, the reflow chamber 203, the cooling chamber 204 and the conveying-out side seal chamber 206. The conveyer 207 is run by driving a motor 221 to move a drive sprocket 220 so that the processing object 218 is conveyed from left to right in FIG. 2. Reference numeral 219 denotes an idler of the conveyer 207.

The infrared heater 208 is disposed in the first zone 201 of the preheating chamber. Hot gas circulating means 212 and 216 formed of cross flow blowers 209 and 213, divergent nozzles 210 and 214 for blowing hot gas, and heaters 211 and 215 are disposed in the second zone 202 of the preheating chamber and the reflow chamber 203, respectively. An infrared heater 231 is disposed in the reflow chamber 203. A cooling coil 217 for passing a low-temperature gas from a gas pipe 222 is disposed inside the cooling chamber 204. The low-temperature gas is passed through the cooling coil 217 through a gas flow-rate control valve 223 and is supplied at all times from each of gas supply-nozzles 224 provided on the entrance and exit sides of the reflow chamber to the reflow chamber 203.

Gas supplied from the gas supply nozzle 224 is blown obliquely downward in a location below the conveyer 207. This is for the purpose of preventing a cooled gas from directly striking the processing object 218 which is transferred on the conveyer 207. Gas is blown out toward the upstream from the gas supply nozzle 224 disposed on the downstream side, and toward the downstream from the gas supply nozzle 224 disposed on the upstream side.

Hot gas blown out from the divergent nozzles 210 and 214 is directed obliquely in the direction of the movement of the processing object 218 on the conveyer 207. As for the cross flow blowers 209 and 213, a cross flow blower 209a is arranged face to face with a cross flow blower 213a above the conveyer 207, and a cross flow blower 209b is arranged back to back with a cross flow blower 213b in a location below the conveyer 207. An impeller 228 (denoted as 228a in FIG. 3) of the cross flow blowers 209 and 213 is supported on a bearing 229 (denoted as 229a in FIG. 3) and driven by a motor 230 (denoted as 230a in FIG. 3). The cross flow blowers 209 and 213 are provided with gas inlet ports on the heaters 211 and 215, and gas whose pressure is increased by the impeller 228 is blown out from the divergent nozzles 210 and 214 toward the processing object 218 conveyed by the conveyer 207.

Reference numeral 225 denotes a processing object detecting apparatus (signal output means). This apparatus, disposed in front of the conveying-in side seal chamber 205, detects the presence of the processing object 218, converts this information into a level of a signal such as a voltage, outputs it, and sends it out to a processing apparatus 226 (control means). The processing apparatus 226 controls a motor controller 227 and the gas flow-rate control valve 223 of the cross flow blowers 209 and 213 on the basis of the result of the detection of the processing object detecting apparatus 225, i.e., an output signal. Reference numeral 232 denotes a speed detector of the conveyer 207. Reference numeral 233 denotes a control valve for controlling the amount of gas supplied from the gas supply nozzle 224. Although the control valve 233 can be controlled manually, an electromagnetic valve which operates in response to a control signal from the processing apparatus 226 may be used instead as required.

Reference numerals 236 and 237 denote temperature sensors disposed in the second zone 202 of the preheating chamber and in the reflow chamber 203, respectively. For example, a temperature sensor 236a is disposed in the blow-out portion of a divergent nozzle 210a, a temperature sensor 236b is disposed in the blow-out portion of a divergent nozzle 210b, a temperature sensor 237a is disposed in the blow-out portion of a divergent nozzle 214a, and a temperature sensor 237b is disposed in the blow-out portion of a divergent nozzle 214b. Reference numeral 238 denotes a gas density sensor disposed in the reflow chamber 203. The detected results obtained in these sensors are sent out to the processing apparatus 226 whereby the gas flow-rate control valve 223 and the motor controller 227 are controlled.

Procedures for the control by the processing apparatus 226 will now be explained in detail along with the conveying operation for the processing object 218.

The operation of the apparatus will be explained below in which nitrogen is used as the gas supplied from the gas supply nozzle 224.

When the processing object 218 is not being conveyed by the conveyer 207, a control valve 233 is adjusted so that nitrogen gas is supplied uniformly from the two gas supply nozzles 224. The inside of the reflow chamber 203 is maintained at an atmosphere having a high nitrogen density in order for nitrogen gas to be supplied from the gas supply nozzle 224 into the reflow chamber 203. The nitrogen gas in the reflow chamber 203 flows out to the second zone 202 of the preheating chamber or the cooling chamber 204, and the chambers 201, 202 and 204 (except the reflow chamber 203) are maintained at a nitrogen density in accordance with the amount of the flowout leakage of the nitrogen gas.

Since the inside of the reflow chamber 203 is arranged so as to be point symmetric with respect to the position of the conveyer 207, the amount of nitrogen gas which flows out to the second zone 202 of the preheating chamber and to the cooling chamber 204 is equal, the gas flow is balanced and a stable state is reached. When there is no detection signal in the processing object detecting apparatus 225, and after it is confirmed by the temperature sensors 236 and 237 and the gas density sensor 238 that the density and temperature of the nitrogen gas in each chamber have reached desired values, the processing apparatus 226 controls the motor controller 227 and the gas flow-rate control valve 223 by sending to the motor controller 227 and the control valve 223, respectively, such signals as to minimize the revolutions of the motor to a predetermined level and to minimize the opening of the gas flow-rate control valves.

When the processing object 218 is conveyed by the conveyer 207, it is detected by the processing object detecting apparatus 225. The detection signal is sent to the processing apparatus 226 whereby signals are sent to the motor controller 227 and the gas flow-rate control valve 223, and the temperature and density of nitrogen are detected by the temperature sensors 236 and 237 and density sensor 238. According to the results, gas temperature and gas density reach desired values necessary for solder reflow, that is, values at which solder is melted sufficiently and oxidation is suppressed.

The processing object 218 is heated to a high temperature by radiation heat from the infrared heaters 208a and 208b disposed above and below the conveyer 207 in the first zone 201 of the preheating chamber. In the second zone 202 of the preheating chamber, nitrogen gas is heated by heaters 211a and 211b to a temperature suitable for preheating and sucked into cross flow blowers 209a and 209b. The pressure of the nitrogen gas is increased by the impeller 228; the nitrogen gas is blown onto the processing object 218 through the divergent nozzles 210a and 210b in order to heat the processing object 218; and the temperature of the nitrogen gas is decreased, and again heated by the heaters 211. The above cycle is repeated.

In the reflow chamber 203, the constitution thereof is similar to one in the second zone 202 of the preheating chamber, however in the second zone 202 of the preheating chamber, infrared heaters 231a and 231b are disposed above and below the conveyer 207 so that the temperature of the hot gas is set at a temperature suitable for soldering which is higher than that in the second zone 202 of the preheating chamber.

In the cooling chamber 204, since a low-temperature nitrogen gas flows through the cooling coil 217, the nitrogen gas leaked out of the reflow chamber 203 is cooled, the processing object 218 is cooled as a result of being exposed to the cooled nitrogen gas, causing the solder to be solidified. In this way, soldering is completed.

The period of time in which the processing object 218 remains in the apparatus is computed on the basis of a detection signal from the processing object detecting apparatus 225 and a signal from the conveyer speed detector 232. If a new detection signal is not sent from the processing object detecting apparatus 225 to the processing apparatus 226 within that time, signals for returning to the predetermined revolutions and opening are sent from the processing apparatus 226 to the motor controller 227 and the gas flow-rate control valve 223 so as to control them.

A processing object detecting apparatus may be disposed after the processing apparatus 226 in order to determine whether the processing object 218 is present in the apparatus. The determination may be based on the fact that the number of detected signals from the processing object detecting apparatus becomes equal to the number of detected signals from the processing object detecting apparatus 225 disposed before the conveying-in side seal chamber 205. A conveying-out signal of the processing object from the apparatus at the previous stage may be used instead of the processing object detecting apparatus 225.

In this way, when the processing object is not present in the apparatus, the opening of the gas flow-rate control valve 223 can be reduced so as to decrease the amount of supplied gas. Therefore, it is possible to reduce the amount of supplied gas consumed in a standby state and to perform satisfactory soldering at a low cost while suppressing oxidation of solder.

Figure 4:
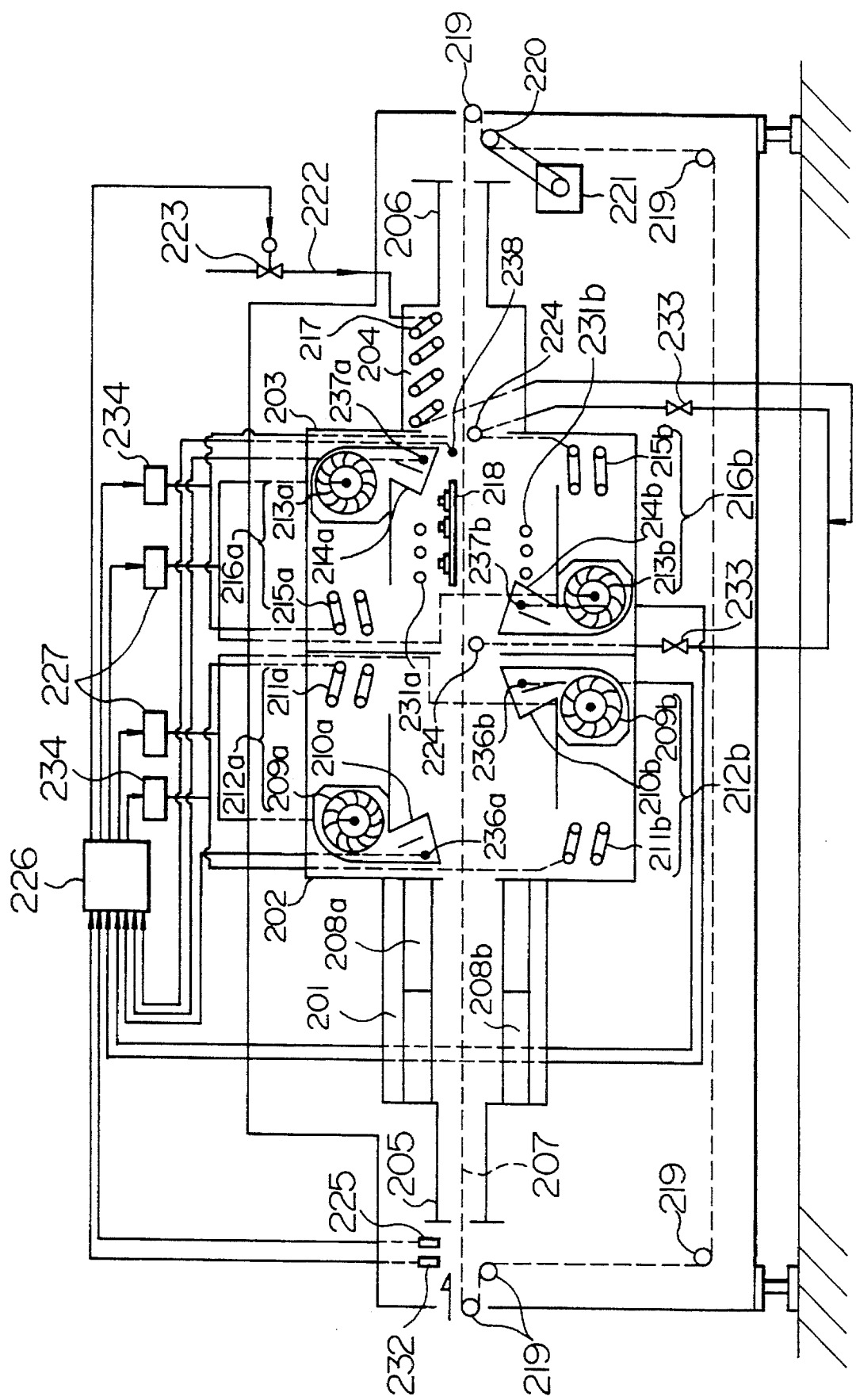
FIG. 4 is a schematic longitudinal sectional view illustrating the construction of a reflow soldering apparatus in accordance with another embodiment of the present invention.

FIG. 4 is a schematic longitudinal sectional view illustrating the construction of a reflow soldering apparatus in accordance with another embodiment of the present invention. Elements in FIG. 4 indicated by the same reference numerals as those in FIG. 2 are identical to those in the previous embodiment, and thus an explanation thereof is omitted. The difference between the embodiment shown in FIG. 4 and the one in FIGS. 2 and 3 is that a temperature controller 234 of the heaters 211 and 215 in the second zone 202 of the preheating chamber and the reflow chamber 203 is controlled by the processing apparatus 226. That is, when no processing object 218 is present in the apparatus, a signal is output from the processing apparatus 226 so that the set value of the temperature is made high in accordance with the reduction in the revolutions of the cross flow blowers 209 and 213.

In the embodiment shown in FIG. 4, when the processing object 218 is conveyed, the revolutions of the cross flow blowers 209 and 213 is increased to a desired value and the amount of circulated hot gas is increased, so that only a short period of time is necessary for the temperature of the hot gas to reach the desired value, improving the reliability of the apparatus. When the temperature of the hot gas reaches the desired value, the amount of power supplied to the heaters 211 and 215 is lowered so as to maintain the temperature necessary for solder reflow, and the temperature of the second zone 202 of the preheating chamber and the reflow chamber 203 can be maintained at a temperature necessary for solder reflow by varying the revolutions of the cross flow blowers 209 and 213.

In the embodiment shown in FIGS. 2 and 3, costs can be reduced by the extent of such a reduction in the amount of the supplied nitrogen gas. In the embodiment shown in FIG. 4, the cost reduction ratio decreases due to the increase in the temperature of the heaters 211 and 215. Since the amount of cost saved by the reduction of nitrogen gas is considerably larger than the cost of the increased power (50 to 70 times larger at a rough estimate), it is possible to realize a reduction in costs even in the embodiment of FIG. 4.

Figure 5:
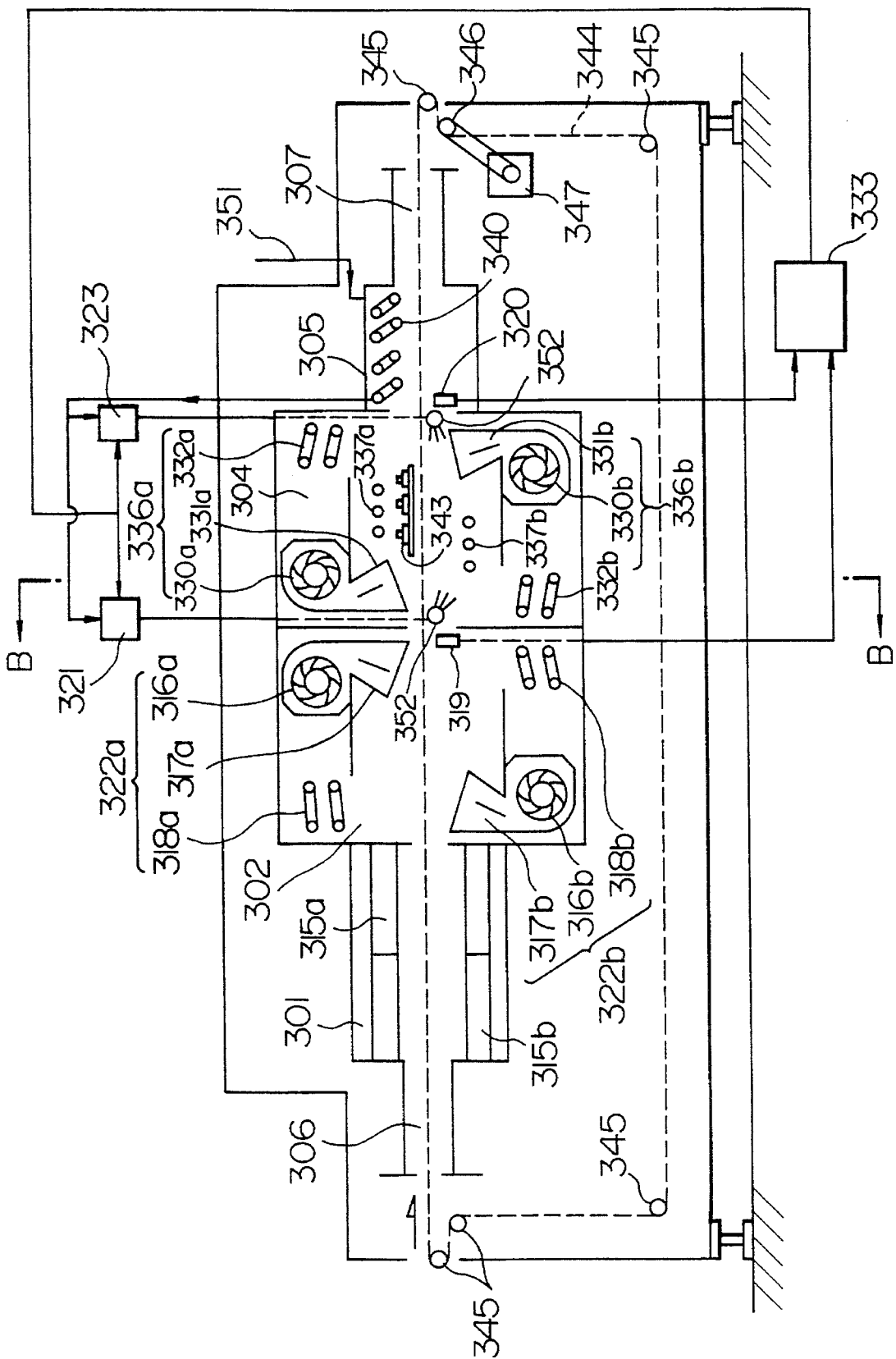
FIG. 5 is a schematic longitudinal sectional view illustrating the construction of a reflow soldering apparatus in accordance with a further embodiment of the present invention.
Figure 6:
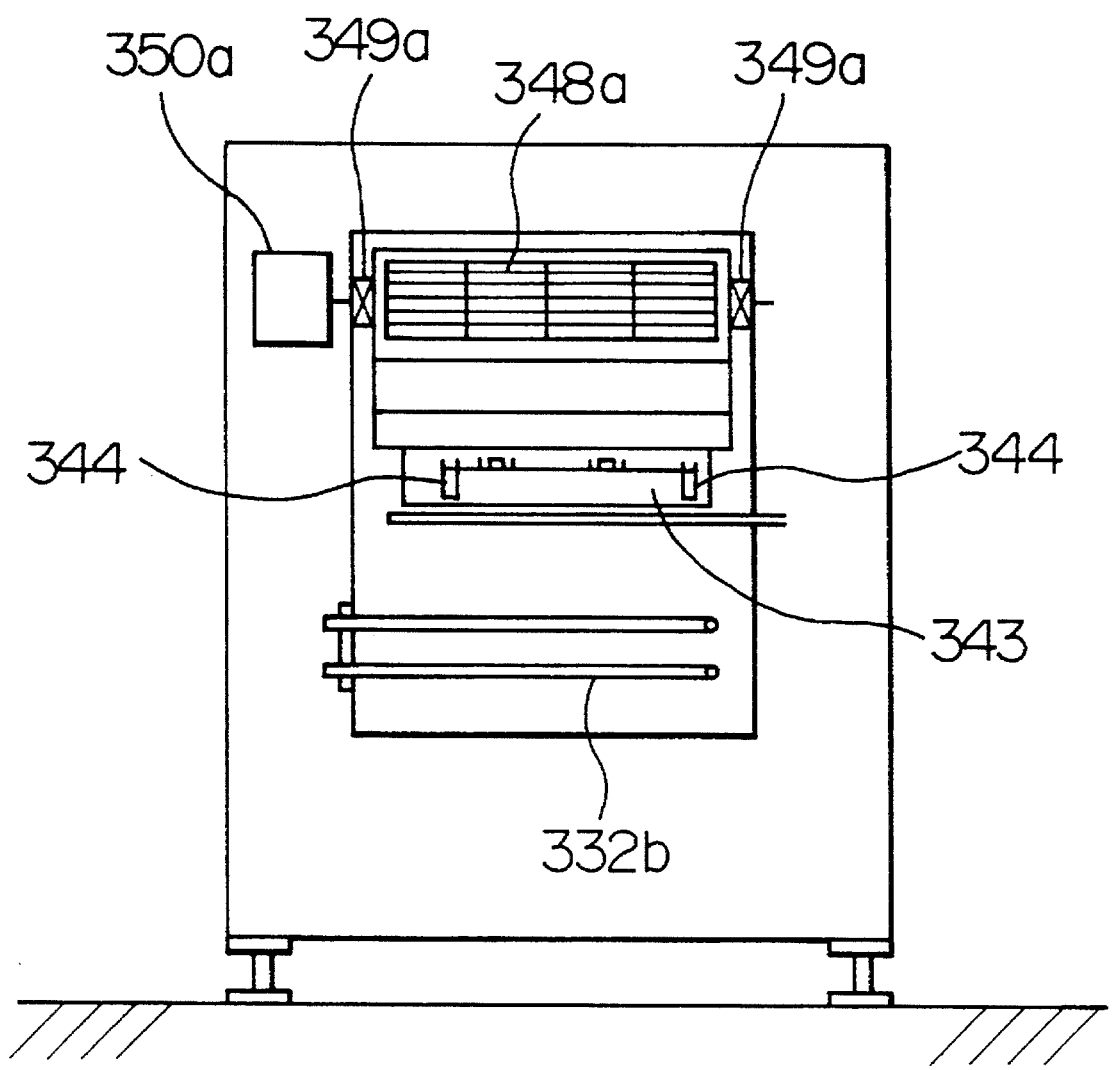
FIG. 6 is a lateral sectional view taken in the direction of the arrows B—B of FIG. 5.

FIGS. 5 and 6 show a reflow soldering apparatus in accordance with a further embodiment of the present invention.

The reflow soldering apparatus shown in FIGS. 5 and 6 comprises a first zone 301 of the preheating chamber, a second zone 302 of the preheating chamber, a reflow chamber 304, a cooling chamber 305, a conveying-in side seal chamber 306, and a conveying-out side seal chamber 307.

A pair-of-endless-chains conveyer (hereinafter simply referred to as a conveyer) is disposed for conveying a processing object 343 through the conveying-in side seal chamber 306, the first zone 301 of the preheating chamber, the second zone 302 of the preheating chamber, the reflow chamber 304, the conveying-in side seal chamber 305 and the conveying-out side seal chamber 307. A drive sprocket 346 is driven by a motor 347 so that a conveyer 344 is moved to convey the processing object 343 from left to right in FIG. 5. Reference numeral 345 denotes an idler of the conveyer 344.

An infrared heater 315 is disposed in the first zone 301 of the preheating chamber. Hot gas circulating means 322 and 336 (hot gas blowing means) comprising cross flow blowers 316 and 330, divergent nozzles 317 and 331, and heaters 318 and 332, are disposed, in the second zone 302 of the preheating chamber and the reflow chamber 304, respectively. Infrared heaters 337 are disposed in the reflow chamber 304. These are disposed in top-bottom symmetry with respect to a conveyer 344.

A cooling coil 340 for passing low-temperature gas from a gas pipe 351 is disposed inside the cooling chamber 305. Low-temperature gas passed through the cooling coil 340 is always supplied from gas supply nozzles 352 disposed in both an entrance and and exit sides of the reflow chamber, to the reflow chamber 304 after passing through gas flow-rate control valves 321 and 323.

Gas supplied from the gas supply nozzle 352 is blown obliquely downward in a location below the conveyer 344. This is for the purpose of preventing a cooled gas from directly striking the processing object 343 which is transferred on the conveyer 344. Gas is blown out toward the upstream from the gas supply nozzle 352 disposed on the downstream side, and toward the downstream from the gas supply nozzle 352 disposed on the upstream side. This is, as will be explained in detail below, for the purpose of preventing gas from flowing between the chambers, in particular, from the second zone 302 of the preheating chamber or the cooling chamber 305 to the reflow chamber 304 when the processing object 343 is transferred on the conveyer 344.

Hot gas blown from the divergent nozzles 317 and 331 is directed obliquely with respect to the direction in which the processing object 343 is moved on the conveyer 344. As for cross flow blowers 316 and 330, a cross flow blower 316a is arranged back to back with a cross flow blower 330a in a location above the conveyer 344, and a cross flow blower 316b is arranged face to face with a cross flow blower 330b in a location below the conveyer 344.

An impeller 348 (denoted as 348a in FIG. 6) of the cross flow blowers 316 and 330 is supported on a bearing 349 (denoted as 349a in FIG. 6) and driven by a motor 350 (denoted as 350a in FIG. 6). The cross flow blowers 316 and 330 are provided with gas inlet ports on the heaters 318 and 332, and the gas whose pressure is increased by the impeller 348 is blown out from the divergent nozzles 317 and 331 toward the processing object 343 which is conveyed by the conveyer 343.

Reference numerals 319 and 320 denote gas flow-speed detecting sensors (gas flow-speed detecting means) which detect the flow speed of gas flowing between the second zone 302 of the preheating chamber and the reflow chamber 304, and between the reflow chamber 304 and the cooling chamber 305. The results of the detection are converted to a level of a signal, such as a voltage, and sent to a gas flow-rate controller (control apparatus) 333 whereby the gas flow-rate control valves 321 and 323 are controlled on the basis of the results of the detection obtained at the gas flow-speed detecting sensors 319 and 320. Specific contents of the operation control will be explained later.

A description will now be given of the operation of the reflow soldering apparatus constructed as described above in which operation nitrogen is used as the gas supplied from gas supply nozzles 352.

When the processing object 343 is not being conveyed by the conveyer 344, the gas flow-rate control valves 321 and 323 are controlled by the gas flow-rate controller 333 so that nitrogen gas is uniformly supplied from the two gas supply nozzles 352. Since the nitrogen gas is supplied from the gas supply nozzles 352 to the reflow chamber 304, the inside of the reflow chamber 304 is maintained at an atmosphere of a high level of nitrogen density.

The nitrogen gas in the reflow chamber 304 flows out to the second zone 302 of the preheating chamber or the cooling chamber 305. The first zone 301 of the preheating chamber, the second zone 302 of the preheating chamber and the cooling chamber 305 (except the reflow chamber 304) have a nitrogen density corresponding to the amount of the flowout leakage thereof, i.e., a nitrogen atmosphere containing oxygen. Since the elements inside the cooling chamber 304 are arranged in point symmetry with respect to the position of the conveyer 344, the flowout amounts of nitrogen gas to the second zone 302 of the preheating chamber and to the cooling chamber 305 are equal to each other. Therefore, the results of the detection obtained in the gas flow-speed detecting sensors 319 and 320 are equal to each other, the gas flow is balanced and a stable state is reached.

When the processing object 343 is conveyed by the conveyer 344, the processing object 343 is heated to a high temperature by the radiation heat from the infrared heater 315 disposed above and below the conveyer 344 in the first zone 301 of the preheating chamber. In the second zone 302 of the preheating chamber, the nitrogen gas is heated to a temperature appropriate for preheating by the heater 318, and sucked in by the cross flow blower 316, the pressure of the nitrogen gas is increased by the impeller 348; the nitrogen gas is blown onto the processing object 343 through the divergent nozzle 317 to thereby heat the processing object 343, with the result that the temperature of the nitrogen gas is decreased, and again heated by the heater 318. The above cycle is repeated.

In the reflow chamber 304, the hot gas is circulated substantially in the similar way as in the second zone 302 of the preheating chamber. Further, since the infrared heaters 337 are disposed above and below the conveyer 344, the temperature of the nitrogen gas is set at a value higher than the temperature in the second zone 302 of the preheating chamber and appropriate for soldering, at which temperature solder is melted.

In the cooling chamber 305, since low-temperature nitrogen gas flows through the cooling coil 340, nitrogen gas leaked out of the cooling chamber 304 is cooled, exposing the processing object 343 to the cooled nitrogen gas so that the processing object 343 is cooled and solidifying the solder. In this way, soldering is completed.

When the processing object 343 is conveyed by the conveyer 344 into the reflow chamber 304, hot gas (high-temperature nitrogen gas) which is blown out of the divergent nozzle 331a and which vertically strikes the processing object 343 is caused to change the direction of its movement by the processing object 343 and flows out to the second zone 302 of the preheating chamber.

The amount of flowout of hot gas into the second zone 302 of the preheating chamber becomes greater than when the processing object 343 is not present. Thus, since the gas pressure in the reflow chamber 304 is lowered, the flowout of hot gas into the cooling chamber 305 decreases. In some cases, there occurs such risk that low-temperature nitrogen atmosphere containing oxygen may flow out from the cooling chamber 305 to the reflow chamber 304 will the result that the atmosphere in the reflow chamber 304 becomes inappropriate for soldering.

The gas flow-speed detecting sensors 319 and 320 detect the flow-speed of gas which flows out from the reflow chamber 304 to the second zone 302 of the preheating chamber and to the cooling chamber 305. The gas flow-rate controller 333 compares the results of its detection with the results of the detection obtained in the gas flow-speed detecting sensors 319 and 320 at the time when no processing object 343 is present, and determines the difference so as to control the gas flow-rate control valves 321 and 323. That is, the gas flow-rate controller 333 controls so that the gas flow-rate control valve 321 is opened and so that the gas flow-rate control valve 323 is closed, with the results that the amount of supplied gas from the gas supply nozzle 352 on the upstream is increased, and that the amount of supplied gas from the gas supply nozzle 352 on the downstream is decreased. The gas supplied from the gas supply nozzles 352 on the upstream flows through the cooling chamber 304 toward the cooling chamber 305, faces against the flow of gas which is going to flow from the cooling chamber 305 into the reflow chamber 304 and blocks the flow-in of gas from the cooling chamber 305, and thus the reflow chamber 304 is maintained at a high temperature and a high nitrogen density.

When the processing object 343 is positioned near the exit from the cooling chamber 304, the flow-out into the cooling chamber 305 is increased, the temperature of the cooling chamber 305 being increased, lowering the effect of the cooling of solder. In addition, low-temperature gas containing oxygen flows in from the second zone 302 of the preheating chamber. In connection with this, the amount of gas supplied from the gas supply nozzles 352 on the downstream are increased to maintain the reflow chamber 304 at a high temperature and a high nitrogen density.

The gas flow-rate controller 333 controls the gas flow-rate control valves 321 and 323 so that the difference in the results of the detections by the gas flow-speed detecting sensors 319 and 320 becomes always zero as the processing object 343 is conveyed.

By making the sum of the amount of gas supplied from the two upper and lower gas supply nozzles 352 be kept always constant, the reflow chamber 304 can be maintained at a high temperature and a high nitrogen density even if the amount of the gas supplied from each of the upper and lower gas supply nozzles 352 varies. In this case, the total amount of the supplied gas is not increased, and therefore the amount of nitrogen which flows out of the apparatus is small. Thus, it is possible to perform soldering at a low cost.

Although in the above-described embodiment the amount of gas supplied from the gas supply nozzles 352 disposed in both the entrance and an exit of the reflow chamber 304 is adjusted to simplify the interior of the cooling chamber 304, gas supply nozzles for blowing gas to block the flow-in of gas from the second zone 302 of the preheating chamber and the cooling chamber 305 may be disposed near the both entrance and exit of the reflow chamber 304, separately from the gas supply nozzles 352.

Although in the above-described embodiment gas supply nozzles are disposed only in the reflow chamber, they may be disposed in the first zone 301 of the preheating chamber, the second zone 302 of the preheating chamber or the cooling chamber 305 as required, so that the amount of supplied gas is controlled by the gas flow-rate controller 333 so as to make the gas density and temperature in each chamber to a desired value.

There occurs such a case that it is impossible to detect the flow speed of gas flowing between chambers by the gas flow-speed detecting sensors 319 and 320 depending upon the positions at which the gas flow-speed detecting sensors 319 and 320 are disposed, the shape of the processing object 343 or the state in which the processing object 343 is conveyed by the conveyer 344. If, for example, the processing object 343 is positioned directly above the gas flow-speed detecting sensor 319, it is impossible to detect the flow-speed of gas which flows out from the reflow chamber 304 to the second zone 302 of the preheating chamber because the gas flow-speed detecting sensor 319 is in the shadow of the processing object 343. In this case, if the gas flow-speed detecting sensor 319 is disposed above the conveyer 344, it is possible to detect the flow-speed of gas flowing out from the reflow chamber 304 to the second zone 302 of the preheating chamber. The same can be said of the disposition of the gas flow-speed detecting sensor 320 on the downstream side. The place at which the gas flow-speed detecting sensor is disposed and the number thereof are not limited to those shown in the embodiment, but a gas flow-speed detecting sensor may be disposed so as to easily and accurately detect the flow speed of gas flowing between chambers.

Still a further embodiment of the present invention will be explained with reference to FIG. 7.

Figure 7:
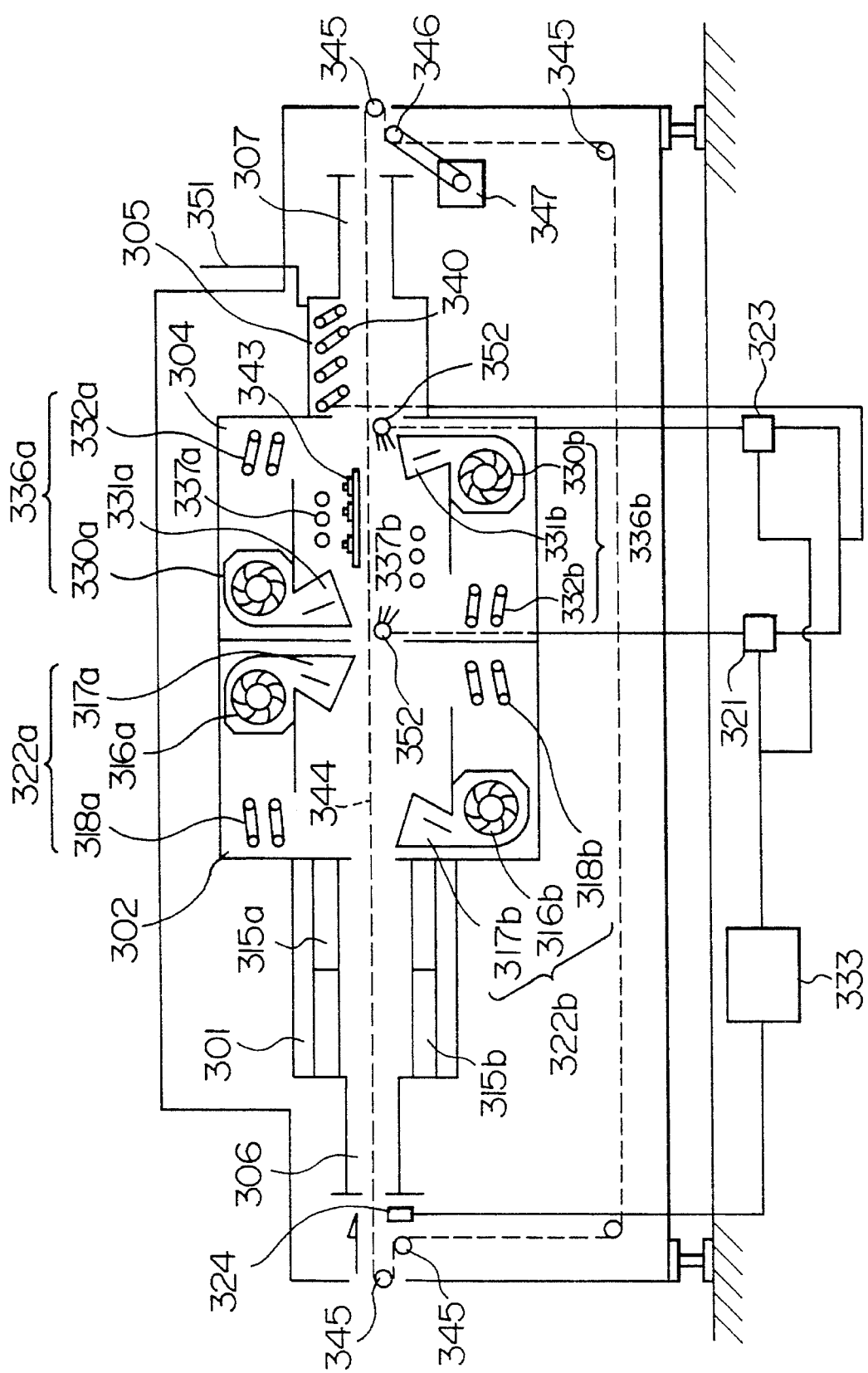
FIG. 7 is a schematic longitudinal sectional view illustrating the construction of a reflow soldering apparatus in accordance with still a further embodiment of the present invention.

Elements in FIG. 7 indicated by the same reference numerals as those in FIG. 5 and 6 are identical to those in the previous embodiment, and thus an explanation thereof is omitted.

The difference between the embodiment shown in FIG. 7 and the one shown in FIGS. 5 and 6 is that a conveyance detecting sensor 324 for detecting that the processing object 343 is conveyed is disposed in an entrance of the conveying-in side seal chamber 306 in place of the gas flow-speed detecting sensors 319 and 320.

The results of the detection by the conveyance detecting sensor 324 is sent to the gas flow-rate controller 333 which computes a time when the processing object 343 enters the reflow chamber 304 or when it leaves from the reflow chamber 304 on the basis of the length of the passage and a period of time required for conveyance, controls the opening and closing degree of the gas flow-rate control valves 321 and 323 on the basis of the amount of gas supplied from the two gas supply nozzles 352 disposed on the upstream and downstream and a supply time, which have been previously determined by experiments or the like, in accordance with the shape of the processing object 343, so that the atmosphere of the reflow chamber 304 is not varied even when the processing object 343 is conveyed.

In this embodiment, not only one detecting apparatus (conveyance detecting sensor 324) is required, but also there is no need to dispose the detecting apparatus at a high temperature, making it possible to increase the service life and reliability of the detecting apparatus.

It is possible to obtain satisfactory solderability by making both the gas density and the amount of supplied gas have desired values before and after a processing object is conveyed into a reflow apparatus and during the conveyance inside the reflow apparatus by combining the embodiment shown in FIGS. 2 and 4, and the one shown in FIGS. 5 and 7, and by carrying out the embodiment.

In the embodiment shown in FIGS. 2 to 7, as for cross flow blowers for blowing hot gas, disposed above and below the conveyer in the preheating chamber or the reflow chamber, either one of the upper or lower cross flow blower may be omitted, or an infrared heater may be disposed in place of the cross flow blower.

Although the present invention has been described with respect to what is considered to be the preferred embodiments, it is understood that the invention is not limited to the disclosed embodiments. To the contrary, the invention is intended to cover various modifications and equivalent arrangements included within the spirit and scope of the appended claims.

What is claimed is:

1. A reflow soldering apparatus, comprising:
   a conveyer which transfers a processing object composed of a circuit substrate which is applied with solder and is mounted with electronic members to a preheating chamber, a reflow chamber and a cooling chamber,
   a means for soldering said electronic members to said circuit substrate by melting said solder with impinging a hot inert gas upon said processing object for preheating and main heating during transferring through said preheating chamber and said reflow chamber and by cooling said solder with exposing said processing object to a cool inert gas during transferring through said cooling chamber,
   means for outputting a signal indicating that a processing object is conveyed into said preheating chamber, and
   means for controlling said hot inert gas blown onto said processing object and inert gas supplied to at least said reflow chamber, wherein the control means reduces both the amount of said hot inert gas blown and the amount of said inert gas supplied to at least said reflow chamber in accordance with a signal output from said signal output means indicating that no processing object is being conveyed into said preheating chamber.

2. A reflow soldering apparatus as claimed in claim 1, wherein means for supplying said inert gas is disposed at least in said reflow chamber, and means for heating the inert gas inside each chamber is disposed in said preheating chamber and said reflow chamber.

3. A reflow soldering apparatus as claimed in claim 1, wherein means is disposed for maintaining the temperature of said hot inert gas at a slightly high temperature so that the temperature of said hot inert gas can be returned quickly to a desired temperature in accordance with a signal output from said signal output means in such a state that no processing object is being conveyed into said preheating chamber.

4. A reflow soldering apparatus as claimed in claim 1, wherein a temperature sensor and a gas density sensor are disposed at least in said reflow chamber, and said control means, in response to an output from each sensor, reduces the amount of hot gas blown and the amount of supplied gas after said reflow chamber has reached a gas temperature and a gas density necessary for soldering after a start-up period of said reflow apparatus.

5. A reflow soldering apparatus comprising:
   a conveyer for transferring a processing object, composed of a circuit substrate having solder applied thereto and having electronic members mounted thereon, to a preheating chamber, a reflow chamber and a cooling chamber,
   means for melting the solder to solder the electronic members to the circuit substrate, said melting means including means for impinging a hot inert gas upon the processing object for preheating and main heating during transferring through said preheating chamber and said reflow chamber, and means for cooling the solder by exposing the processing object to a cool inert gas during transferring through said cooling chamber, and
   gas flow-rate control means for computing variations in the gas flow between said chambers on the basis of an output from said gas flow-speed detecting means and for controlling gas flow-rate control valves so as to blow gas from inert gas supply nozzles disposed at least in said reflow chamber in accordance with the computed variations so that variation in the gas flow is prevented between the chambers, and
   a conveyance detecting means disposed in an entrance of said preheating chamber for detecting that the processing object is conveyed in said reflow soldering apparatus.

6. A reflow soldering apparatus as claimed in claim 5, wherein said inert gas supply nozzles are disposed in an entrance and an exit of a chamber, the nozzles disposed on the entrance side being made to blow and supply inert gas to the exit side, and the nozzles disposed on the exit side being made to blow and supply inert gas to the entrance side.

7. A reflow soldering apparatus, comprising:
   a conveyer for transferring a processing object, composed of a circuit substrate having solder applied thereto and having electronic members mounted thereon, to a preheating chamber, a reflow chamber and a cooling chamber,
   means for melting the solder to solder the electronic members to the circuit substrate, said melting means including means for impinging a hot inert gas upon the processing object for preheating and main heating during transferring through said preheating chamber and said reflow chamber, and means for cooling the solder by exposing the processing object to a cool inert gas during transferring through said cooling chamber,
   means for outputting a signal indicating that a processing object is conveyed into said preheating chamber, said signal outputting means comprising a gas flow-speed detecting means disposed in an entrance of said preheating chamber,
   means for controlling said hot inert gas blown onto said processing object and inert gas supplied to at least said reflow chamber, and
   gas flow-speed control means for computing variations in the gas flow between said chambers on the basis of an output from said gas flow-speed detecting means and for controlling gas-flow rate control values so as to blow gas from inert gas supply means disposed in said reflow chamber in accordance with the computed variations, so as to inhibit variation in the gas flow between chambers.

8. A reflow soldering apparatus as claimed in claim 7, wherein said gas impinging means comprises inert-gas supply nozzles disposed in an entrance and an exit of a chamber, the nozzles disposed on the entrance side being made to blow and supply inert gas to the exit side, and the nozzles disposed on the exit side being made to blow and supply inert gas to the entrance side.

* * * * *